P. J. STRIMPLE.
DIRIGIBLE HEADLIGHT.
APPLICATION FILED NOV. 14, 1917.
1,281,226. Patented Oct. 8, 1918.
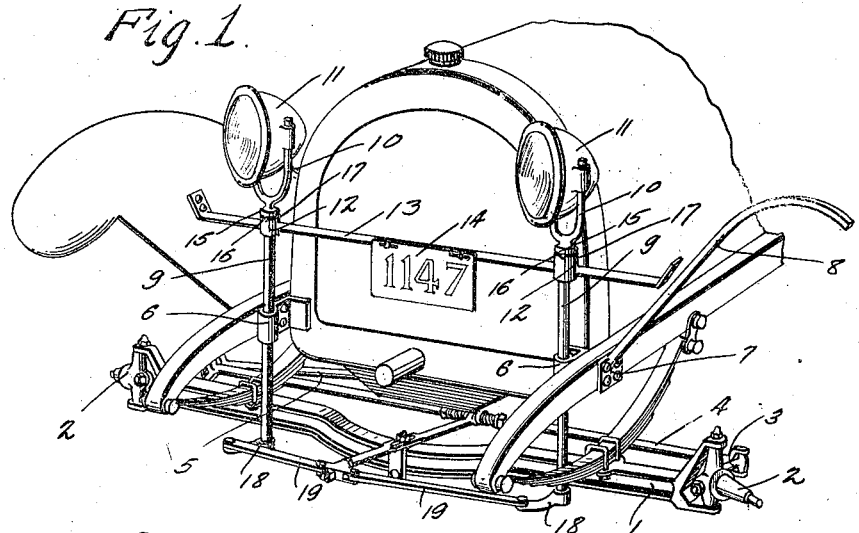
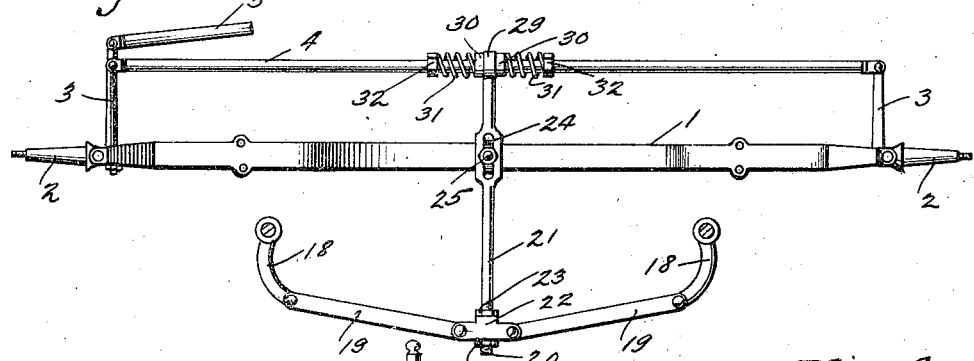
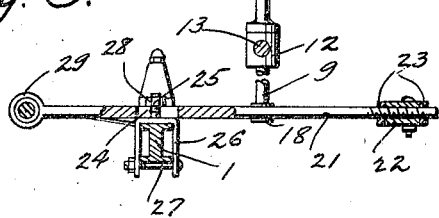
Inventor
P. J. Strimple
Attorney

UNITED STATES PATENT OFFICE.

PIERCE J. STRIMPLE, OF CLEVES, OHIO, ASSIGNOR OF ONE-HALF TO STANLEY STRUBLE, OF CINCINNATI, OHIO.

DIRIGIBLE HEADLIGHT.

1,281,226.  Specification of Letters Patent.  Patented Oct. 8, 1918.

Application filed November 14, 1917. Serial No. 201,993.

*To all whom it may concern:*

Be it known that I, PIERCE J. STRIMPLE, a citizen of the United States, residing at Cleves, in the county of Hamilton, State of Ohio, have invented certain new and useful Improvements in Dirigible Headlights; and I do hereby declare the following to be a full, clear, and exact description of the invention, such as will enable others skilled in the art to which it appertains to make and use the same.

This invention relates to dirigible headlights.

The object of the invention is to improve the construction of dirigible headlight mechanisms in such a manner that the headlights will be caused to more faithfully follow the course of the front wheels. That is, it is desired and accomplished by this invention to cause one lamp to turn more rapidly than the other and also to turn more rapidly than the wheels. There is thereby secured a more adequate illumination of the road on turns than has been possible with those dirigible headlight structures which have been known to me.

With the above objects in view, and such others relating to the details of construction, as may hereinafter appear, my invention will now be fully set forth and described, reference being had to the accompanying drawings.

In the drawings:—

Figure 1 is a perspective view showing the dirigible mechanism mounted upon an automobile, Fig. 2 is a horizontal section, Fig. 3 is a longitudinal section, and Fig. 4 is an enlarged view of a connecting device used with my invention.

Referring more particularly to the drawings, 1 represents the front axle which carries the steering wheel spindles 2 in the usual manner. The spindles 2 furthermore carry the usual steering arms 3 which are connected by the steering arm connecting rod 4. The steering post (not shown), is linked to the steering arm 5 in a usual manner, so that as one steering arm 3 is swung the rod 4 moves transversely to move both arms 3.

Secured to the sides of the automobile frame, and in front of the radiator are the bearing brackets 6, which are preferably secured opposite the feet 7 of the fender braces 8, so as to avoid the necessity of boring extra bolt holes through the side bars of the chassis. The bearings 6 carry in vertical relation, the lower ends of the lamp standards 9 whose upper ends carry the lamp yokes 10 within which the lamps 11 are mounted in a usual manner. Below the yokes 10, the standards pass through upper bearings 12 which are formed as parts of a transverse brace bar 13, extended across the brace bars 8, to which it may be riveted or bolted in accordance with the desired practice. The cross bar 13 may be used as a support for a license plate 14, and aside from carrying the upper portions of the standards 9, serves to more rigidly support the fenders of the automobile. Above bearings 12 there is formed upon the standards, either as integral castings, or as collars set thereon, the abutments 15 which have the radial ridges or ribs 16 formed upon their lower faces. Said ribs or ridges 16, coöperate with corresponding grooves 17 formed in the bearings 12, the interlocking of the ribs 16 and the grooves 17 determining the straight forward position of the headlights.

The lower ends of the standards 9 are provided with forwardly projecting crank arms 18 to whose outer ends are pivotally connected the links 19. Said arms 18 are arched or curved toward one another, and also converge toward one another in addition to their curvature for a purpose which will hereinafter appear. The links 19 extend inwardly toward one another and have their opposing ends pivoted to a cross head 20. The cross head 20 is carried upon the forward end of a rock bar 21, a bearing 22 having the forward end of the bar 21 extended therein and being held in position by means of front and rear adjusting nuts 23, by whose manipulation the cross head 20 may be longitudinally adjusted upon the bar 21.

The rock bar 21 is provided with an intermediate bearing opening 24 which divides the bar into a rear short arm and a long forward arm. Furthermore, the bearing 24 is elongated, and rests upon an upwardly projecting spindle 25 which rises from a supporting yoke 26. The supporting yoke 26 is an inverted U-shaped element whose side arms embrace the front and rear faces of the axle 1, and are secured in position by means of a transverse bolt 27. The free end of the spindle 25 is threaded, so as to receive the nut 28 by means of which the rock bar 21 is held in position. The rear end of the rock bar 21 is provided with an eye 29 which is passed onto the steering rod 4, so as to lie practically at its middle point. Upon each side of the eye 29 there is located a slide sleeve 30 against which a spring 31 abuts. The sleeves 30 and the springs 31 are also threaded upon the steering rod 4, and are held up against the eye 29 by means of the adjusting nuts 32 threaded upon the steering rod 4. It will be noted from the foregoing that the rock bar 21 is not only rotatable upon the spindle 25, but also has a limited longitudinal movement which is determined by the slotted bearing opening 24, and furthermore that the resilient connection which is provided between the eye 29 and the steering rod 4 by means of the springs 31 acts to take up the loose motion of the steering gear without communicating the latter to the lamps.

When the steering mechanism of the automobile is operated so as to throw the steering rod 4 transversely of the machine, the rock bar 21 is oscillated, the long forward arm thereof through the cross head 20 operating the links 19 to swing the lamps 11 through the arms 18 and the standards 9. Thereby the lamps are rotated ahead of or faster than the automobile wheels. Also, the cross head 20, together with the inwardly curved construction of the arms 18 causes the inside light to turn through a greater arc than the outside light, so that while the latter directs the major portion of its rays along the roadway, the inside light will illuminate the whole of the inside of a curve in the road. Obviously, this provides a very practical and simple mechanism for definitely fixing the headlights of an automobile to cover a curve in a road, and therefore imparts to dirigible headlights a high degree of efficiency.

What I claim as my invention is:—

1. A dirigible headlight mechanism for automobiles, comprising in combination with the steering arm connecting rod, a pair of rotatable lamp standards, forwardly and inwardly directed arms rigidly carried by the lamp spindles, a pair of links connected to the free ends of said arms, a rock bar mounted upon the axle of the machine so as to have a short rear arm and a long forward arm, a cross head on the forward arm, said cross head having the opposing ends of said links connected thereto, and a connection between the rear end of the arm and said steering arm connecting rod.

2. A dirigible headlight mechanism for automobiles, comprising in combination with the steering arm connecting rod, a pair of rotatable lamp standards, forwardly and inwardly directed arms rigidly carried by the lamp spindles, a pair of links connected to the free ends of said arms, a rock bar mounted upon the axle of the machine so as to have a short rear arm and a long forward arm, a cross head on the forward arm, said cross head having the opposing ends of said links connected thereto, and a connection between the rear end of the arm and said steering arm connecting rod, said rock bar having a rotatable and sliding connection with the axle.

In testimony whereof, I affix my signature in the presence of two witnesses.

PIERCE J. STRIMPLE.

Witnesses:
J. H. WEST,
R. C. HUGENTOBLER.